United States Patent
McGuire, Jr.

(10) Patent No.: US 10,315,399 B2
(45) Date of Patent: Jun. 11, 2019

(54) METHODS FOR APPLICATION OF POLYMERIC FILM AND RELATED ASSEMBLIES

(71) Applicant: James E. McGuire, Jr., Palm Beach, OH (US)

(72) Inventor: James E. McGuire, Jr., Palm Beach, OH (US)

(73) Assignee: entrotech, inc., Columbus, OH (US)

( * ) Notice: Subject to any disclaimer, the term of this patent is extended or adjusted under 35 U.S.C. 154(b) by 331 days.

(21) Appl. No.: 14/145,408

(22) Filed: Dec. 31, 2013

(65) Prior Publication Data

US 2015/0183198 A1    Jul. 2, 2015

(51) Int. Cl.
| | |
|---|---|
| B29C 63/00 | (2006.01) |
| B29C 63/02 | (2006.01) |
| B32B 37/00 | (2006.01) |
| B29C 63/48 | (2006.01) |
| B29L 31/48 | (2006.01) |

(52) U.S. Cl.
CPC ........ B32B 37/003 (2013.01); B29C 63/0047 (2013.01); B32B 37/0007 (2013.01); B29C 63/02 (2013.01); B29C 2063/483 (2013.01); B29L 2031/4821 (2013.01); Y10T 428/24628 (2015.01)

(58) Field of Classification Search
CPC ... C23C 16/12; B37B 37/0007; B32B 37/003; B32B 37/10; B29C 63/0047; B29C 63/02; B29L 2031/4821
See application file for complete search history.

(56) References Cited

U.S. PATENT DOCUMENTS

| | | | | |
|---|---|---|---|---|
| 3,466,189 A | * | 9/1969 | Erb | F28F 13/04 |
| | | | | 165/133 |
| 3,968,270 A | * | 7/1976 | Hasegawa | C23C 14/32 |
| | | | | 204/164 |

(Continued)

FOREIGN PATENT DOCUMENTS

| | | |
|---|---|---|
| CN | 202830519 | 3/2013 |
| EP | 1011744 | 12/1965 |
| JP | 55044806 | 3/1980 |

OTHER PUBLICATIONS

"3M™ Scotchcal™ Graphic Film with Comply™ Adhesive IJ35C-10 White, 54 in × 50 yd," http://solutions.3m.com/wps/portal/3M/en_US/Graphics/3Mgraphics/Products/Catalog/?N=4294939.859+5019245&Nr=And(hrcy_id%3AGCQZXFFN5Jgs_C2WZSGOHFD_N2RL3FHWVK_GPDOK8BC31gv)&rt=d (Jul. 26, 2013).

(Continued)

*Primary Examiner* — Christopher T Schatz
(74) *Attorney, Agent, or Firm* — The Griffith Law Firm, A P.C.; Lisa M. Griffith

(57) ABSTRACT

A method of applying a polymeric film to an article when forming an assembly according to the invention comprises: providing a polymeric film sized to cover at least a portion of at least one exterior surface of the article; providing at least one gaseous agent to form a coating on at least one surface of the polymeric film and/or at least one exterior surface of the article to be contacted when forming an assembly; contacting at least a portion of the polymeric film and at least a portion of the at least one exterior surface of the article; and form-fitting the polymeric film with the portion of the at least one exterior surface of the article.

27 Claims, 6 Drawing Sheets

(56) References Cited

U.S. PATENT DOCUMENTS

| | | | |
|---|---|---|---|
| 5,525,290 A | 6/1996 | Carpenter | |
| 5,897,930 A | 4/1999 | Calhoun et al. | |
| 6,413,630 B1 * | 7/2002 | Nakayama | B29C 45/14811 219/386 |
| 7,332,205 B2 | 2/2008 | Hannington et al. | |
| 7,686,910 B2 | 3/2010 | Habisreitinger et al. | |
| 7,854,985 B2 | 12/2010 | Song et al. | |
| 8,062,451 B2 | 11/2011 | Mozer et al. | |
| 2003/0150547 A1 | 8/2003 | Kesti et al. | |
| 2005/0084687 A1 | 4/2005 | Scheirs et al. | |
| 2006/0159867 A1 | 7/2006 | O'Donnell | |
| 2006/0237133 A1 * | 10/2006 | Akamatsu | B32B 38/18 156/313 |
| 2007/0281126 A1 * | 12/2007 | Lahann | C09J 5/04 428/98 |
| 2008/0044940 A1 * | 2/2008 | Watanabe | B32B 37/20 438/64 |
| 2008/0138603 A1 | 6/2008 | Grussaute-Nghiem et al. | |
| 2008/0286576 A1 | 11/2008 | McGuire, Jr. | |
| 2009/0229857 A1 * | 9/2009 | Fredenberg | B81C 99/0085 174/126.2 |
| 2010/0059167 A1 | 3/2010 | McGuire, Jr. | |
| 2011/0111157 A1 | 5/2011 | Onderisin et al. | |
| 2011/0182076 A1 | 7/2011 | Sherman et al. | |
| 2012/0064304 A1 | 3/2012 | Bharti et al. | |
| 2012/0100326 A1 | 4/2012 | Sherman et al. | |
| 2012/0222803 A1 | 9/2012 | Bunch et al. | |
| 2013/0089704 A1 | 4/2013 | Schneider | |
| 2013/0098543 A1 | 4/2013 | Reuter et al. | |

OTHER PUBLICATIONS

"Avery SC Easy Apply RS Wrapping Film," Product Data Sheet, Avery Dennison Corp., www.averygraphics.com (May 4, 2011).

"Challenges in Developing a Premask for Air Egress Liners: RTape Develops 4761RLA for Air Egress Films," http://www.rtape.com/blog-post/challenges-in-developing-a-premask-for-air-egress-liners (Dec. 6, 2012).

* cited by examiner

METHODS FOR APPLICATION OF POLYMERIC FILM AND RELATED ASSEMBLIES

BACKGROUND OF THE INVENTION

The present invention relates generally to methods for application of polymeric film to a surface and related assemblies.

Painted surfaces are commonly used in many different types of applications. Painted surfaces may not only improve aesthetic properties, but they may also or alternatively improve functional properties of underlying surfaces and help protect the same. One such application is in the transportation industry, where exterior painted surfaces are typically exposed to a variety of environments, some of which can be very harsh on the surface. Examples of articles in the transportation industry having such painted surfaces include vehicles providing transportation over land, in the water, and in the air. Such vehicles include aircraft and motorized vehicles like automobiles and trucks. The paint on such surfaces can function to protect the underlying surface from damage due to that exposure. However, the paint itself must also be durable to withstand repeated exposure to such damaging environments.

Recently, paint in film form has been developed for application to such surfaces as an alternative to traditional paint, which traditional paint is typically liquid-based and applied to surfaces in its liquid form. Paint in film form is based on at least one polymeric film and is also referred to herein as a "polymeric film" or "polymeric paint film." An example of such polymeric paint film is described in U.S. Patent Publication No. US-2010-0059167-A1, entitled "Paint Replacement Films, Composites Therefrom, and Related Methods."

Yet, as with application of other polymeric films to surfaces, particularly those surfaces having complex topographies, adequate adhesion at an interface and effective removal of entrapped air between the polymeric film and the underlying surface has proven to be a challenge. For example, in many cases, as adhesive adhering the polymeric film attaches to an underlying surface, which adherence does not necessarily progress along a uniform front, particularly as topography of the underlying surface increases in complexity (i.e., such that it contains significant convex and concave portions), air often becomes entrapped at the interface between the polymeric film and the underlying surface. Due to the adhesive's presence at the advancing front, beyond which is entrapped air, air becomes increasingly difficult to completely remove as adherence of the polymeric film progresses. As such, mechanisms for facilitating air bleed from such interfaces have been explored.

Many conventional air bleed mechanisms rely on use of structured adhesive layers to remove entrapped air. For example, see U.S. Patent Publication No. 2011/0111157 and U.S. Pat. No. 7,332,205. Another polymeric film structure known to facilitate air bleed between the structure and an underlying surface after application includes a microstructured surface, such as that described in U.S. Pat. No. 5,897,930. While effective in many applications, such microstructures have been found to obscure optical clarity in certain applications. For example, structure from the adhesive layer is often still visible (including to the naked human eye) after application of the polymeric film to an underlying surface. Visibility is even more pronounced as thickness of the polymeric film decreases and/or transparency of the polymeric film increases. As is readily understood, this presents a less than ideal solution to the problem of removal of entrapped air. In addition, types of polymeric films able to be effectively applied to an article's surface are limited by the constraints associated with presence of such a microstructured surface.

Thus, alternative methods for application of polymeric films to a surface and related assemblies are desired.

BRIEF SUMMARY OF THE INVENTION

A method of applying a polymeric film to an article when forming an assembly according to the invention comprises: providing a polymeric film sized to cover at least a portion of at least one exterior surface of the article; providing at least one gaseous agent to form a coating on at least one surface of the polymeric film and/or at least one exterior surface of the article to be contacted when forming an assembly; contacting at least a portion of the polymeric film and at least a portion of the at least one exterior surface of the article; and form-fitting the polymeric film with the portion of the at least one exterior surface of the article. According to a further embodiment, the method also comprises the step of removing substantially all of the coating at an interface between the polymeric film and the article.

In one embodiment, the at least one gaseous agent substantially remains in the form of a coating or layer after its application to a surface. In another embodiment, the at least one gaseous agent is dissipative. According to one aspect of this embodiment, the step of form-fitting the polymeric film may comprise form-fitting the polymeric film using vacuum forming techniques.

While selection may vary, in an exemplary embodiment, the at least one gaseous agent is water-based—e.g., steam. In another exemplary embodiment, the at least one gaseous agent is alcohol-based.

While properties of the polymeric film can vary, in one embodiment, the polymeric film is stretchable. In a further embodiment, the polymeric film is extensible. While no additives altering the appearance of an underlying article may be present, in one embodiment, the polymeric film comprises an at least partially pigmented polymeric film. In another embodiment, the polymeric film comprises an at least partially metallized polymeric film.

In one embodiment, the polymeric film comprises an adhesive layer. According to one aspect of this embodiment, the adhesive layer of the polymeric film is adhered to an essentially smooth release liner prior to forming the assembly. The method according to this embodiment further comprises the step of removing the essentially smooth release liner from the adhesive layer prior to forming the assembly.

While thickness may vary, in one embodiment, the polymeric film has an overall thickness of less than about 400 microns. According to a further embodiment, the polymeric film has an overall thickness of less than about 50 microns.

Further, while its thickness and/or continuity may vary across a surface and/or depending on the application, in one embodiment, the coating comprises an array of droplets having an average diameter of less than about 200 microns. In one embodiment, the coating comprises an array of droplets, each droplet having a height of less than about 200 microns. The coating is differentiated based on its method of formation according to the present invention and, as such, provides advantageous properties. In one embodiment, volume of liquid in the coating is less than approximately 90% of volume of an equivalent liquid in a monolithic film extending across an identical surface area and having a thickness approximating thickness of the coating. For example, the coating has a coating weight of less than about 100 grams per square meter, less than about 50 grams per square meter, and even less than about 10 grams per square meter.

Polymeric films may be applied to a variety of articles according to methods of the invention. When applied according to methodology of the invention, assemblies having essentially no visible air pockets/bubbles and markings present between the polymeric film and the article are obtainable. In one embodiment, the article comprises at least a portion of a helmet. In another embodiment, the article comprises at least a portion of a motorized vehicle. In an exemplary embodiment, the article comprises at least a portion of an aircraft. In another exemplary embodiment, the article comprises at least a portion of an automobile.

BRIEF DESCRIPTION OF THE DRAWINGS

Certain embodiments of the present invention will hereinafter be described in conjunction with the following drawing figures, wherein like numerals denote like elements—e.g., 100, 200, 300, et cetera, and wherein.

DETAILED DESCRIPTION OF THE PREFERRED EMBODIMENTS OF THE INVENTION

Figure 1:
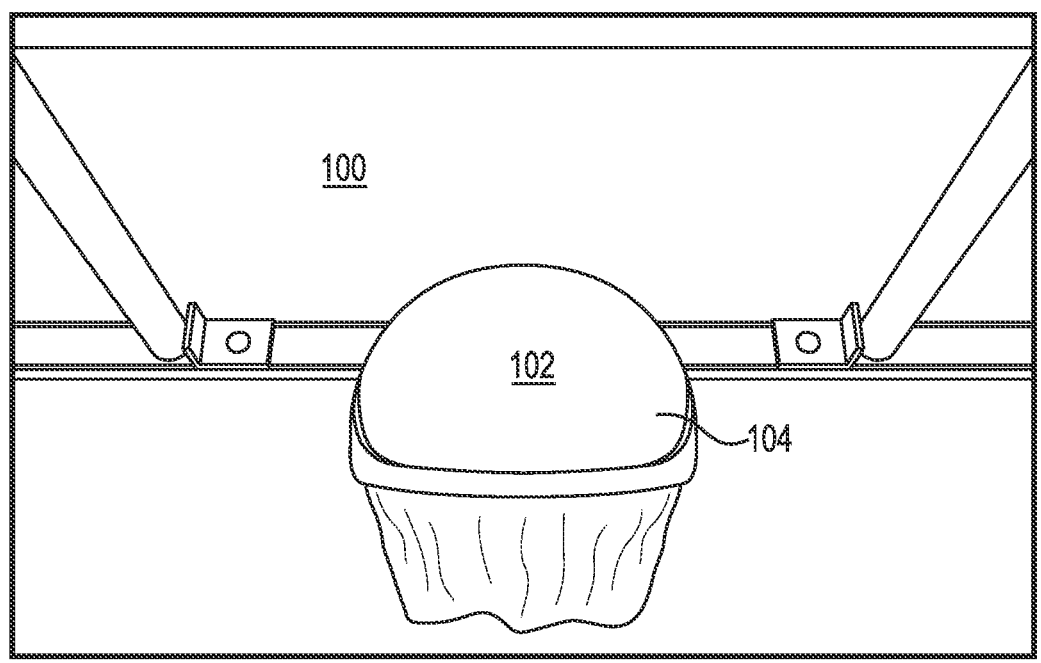
FIG. 1 is a perspective view of a step of providing a polymeric film sized to cover at least a portion of at least one exterior surface of a helmet.

"Polymeric films" applied to articles according to methods of the invention comprise at least one polymer layer and, optionally, at least one adhesive layer. Although, thickness may be much greater, in an exemplary embodiment, the polymeric film has an overall thickness of less than about 400 microns. In a further embodiment, the polymeric film has an overall thickness of less than about 200 microns. In a further embodiment still, the polymeric film has an overall thickness of less than about 50 microns. In yet a further embodiment, the polymeric film has an overall thickness of about 10 microns. Generally, thicker polymeric films provide greater abrasion resistance, while thinner polymeric films may be used when corrosion or similar resistance is of primary concern.

The polymeric film may, optionally, be at least partially pigmented (i.e., colored) and/or at least partially metallized as a "polymeric paint film." In an exemplary embodiment, a polymeric film of the invention is at least partially pigmented. Depending upon, among other considerations, the type of pigment and thickness of the polymeric film, pigmented polymeric films of the invention may be substantially translucent or substantially opaque.

In another exemplary embodiment, a polymeric film of the invention is metallized. Generally, metallized polymeric films of the invention are substantially opaque, but metallized polymeric films may be at least partially transparent depending on the degree of metallization.

In a further exemplary embodiment, a polymeric film of the invention is both pigmented and metallized. However, the polymeric film need not contain additives altering the appearance of an underlying article to be considered a polymeric film applicable according to methods of the invention.

In another exemplary embodiment, the polymeric film is essentially free of pigment and metallization. According to one aspect of this embodiment, the polymeric film is substantially transparent. According to another aspect of this embodiment, the polymeric film is substantially translucent. According to another aspect of this embodiment, the polymeric film is substantially opaque.

In order to facilitate adherence of the polymeric film to surfaces having relatively complex topographies, preferably, the polymeric film is stretchable. The term "stretchable" refers to a material's ductility and its ability to be stretched (i.e., elongated). Exemplary stretchable polymeric films are capable of being stretched to a length that is at least about 105% of its initial length or more without breaking. For example, a stretchable polymeric film having a length of 100 centimeters is capable of being stretched to a length of 105 centimeters or more without breaking. In one embodiment, stretchable polymeric films are capable of being stretched to a length that is at least about 125% of its initial length or more without breaking. For example, a stretchable polymeric film having a length of 100 centimeters is capable of being stretched to a length of 125 centimeters or more without breaking. In another embodiment, stretchable polymeric films are capable of being stretched to a length that is at least about 150% of its initial length or more without breaking. For example, a stretchable polymeric film having a length of 100 centimeters is capable of being stretched to a length of 150 centimeters or more without breaking.

In one embodiment, the polymeric film does not fully recover once stretched. An exemplary polymeric film having such reduced recovery is capable of being stretched to a length that is at least about 110% of its initial length without breaking, but the polymeric film does not recover to its original state after such stretching. According to one aspect of this embodiment, the polymeric film recovers to no less than about 105%, or preferably to no less than about 110% of its initial length, after stretching to a length that is at least about 110% of its initial length.

In another embodiment, the polymeric film is not only stretchable, but also extensible. The terms "extensible" and "extensibility" refer to a material's ductility and its ability to be stretched and recover to essentially its original state after stretching. Extensible polymeric films are capable of recovering to their original state when stretched up to about 125% of their initial length or more. That is, extensible polymeric films are capable of recovering to their original state when stretched to a length that is about 125% or more of its initial length. For example, a polymeric film having an initial length of about 100 centimeters is capable of recovering to a length of about 100 centimeters after being stretched to a length of 125 centimeters or more when it is extensible. Preferably, extensible polymeric films are capable of recovering to their original state when stretched up to about 150% of their initial length or more.

In another preferred embodiment, the polymeric film exhibits essentially no plastic deformation when stretched up to about 125% of its initial length—e.g., when a polymeric film is stretched from an initial length of 100 centimeters up to a length of about 125 centimeters. In a further preferred embodiment, the polymeric film exhibits essentially no plastic deformation when stretched up to about 150% of its initial length—e.g., when a polymeric film is stretched from an initial length of 100 centimeters up to a length of about 150 centimeters. Preferably, a force of less than about 40 Newtons is required to elongate the polymeric film to 150% its initial length.

According to a preferred embodiment of the invention, polymeric films are capable of elongating more than 200% before breaking. In still another preferred embodiment, the polymeric film exhibits greater than about 210% elongation at break when tested according to ASTM D638-95. In a further preferred embodiment, the polymeric film exhibits greater than about 260% elongation at break when tested according to ASTM D638-95. In a still further preferred embodiment, the polymeric film exhibits greater than about 300% elongation at break when tested according to ASTM D638-95. In yet another preferred embodiment, the polymeric film exhibits greater than about 350% elongation at break when tested according to ASTM D638-95.

Again, polymeric films applied to articles according to methods of the invention comprise at least one polymer layer and, optionally, at least one adhesive layer. Useful polymeric films comprise any suitable chemistry. While more than one polymer layer and/or adhesive layer can be used in polymeric films of the invention, and/or a polymer layer and/or adhesive layer can comprise more than one distinct polymer, the following description is made with reference to one such layer and type of polymer within that layer for simplicity only. Recognize that, if multiple polymers and/or polymer layers and/or adhesive layers are used, each polymer, polymer layer, and/or adhesive layer can be the same or different.

The polymer layer comprises any suitable material. For example, the polymer layer may be polyurethane-based, polyacrylate-based, polyepoxide-based, or polyester elastomer-based. Although generally not preferred for certain embodiments due to its relatively low extensibility, the polymer layer can also be polyvinyl-based, such as polyvinyl chloride (PVC), polyvinyl acetate (PVA), polyvinylidene fluoride (PVDF), or general polyvinyl fluoride (PVF) (e.g., that available from DuPont under the TEDLAR trade designation), or α-olefin-based in embodiments where full recovery of the polymeric film after stretching is not necessary or desired.

The polymer layer is preferably polyurethane-based in that it comprises any suitable polyurethane material. For simplicity, the term "polyurethane" is sometimes used herein to reference polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. Many commercially available polyurethanes are available and suitable for use as polyurethane-based polymer layers according to the invention. For example, suitable polyurethanes are available from entrotech, inc. (Columbus, Ohio) under the HT1331, HT2312, HT2313 trade designations.

In addition to additives altering the appearance of an article, which additives are present in exemplary embodiments, any suitable additives can optionally be included in the polymer layer. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, fillers, and other conventional additives as known to those of ordinary skill in the art can be incorporated into the polymer layer. If desired, an adhesion promoter may be included in the polymer layer. However, in preferred embodiments, the material comprising the polymer layer is selected to be chemically compatible with adjacent layers of the polymeric film. Thus, an adhesion promoter is not required according to preferred embodiments of the invention.

The polymer layer may be pigmented and/or metallized and substantially transparent, substantially translucent, or substantially opaque, depending on the application. When the polymer layer is substantially transparent or substantially translucent, but a pigmented and/or metallized polymeric film is desired, at least one pigmented and/or metallized layer may be provided within the polymeric film, between the polymer layer and the optional adhesive layer. Alternatively, or in combination with at least one pigmented and/or metallized layer within the polymeric film, a pigmented and/or metallized layer can be provided on an outer surface of the polymer layer in such an embodiment. When the polymer layer is substantially opaque in such an embodiment, pigment and/or metallization is generally provided on an outer surface of the polymer layer, on a side that is outwardly exposed when the polymeric film is adhered to a surface. In this embodiment, the polymer layer can be impregnated with a material (e.g., titanium dioxide) that causes the polymer layer to function as a reflective background, bringing out the color of the overlying pigment. Pigment and/or metallization may also be provided on an outer surface of the polymer layer, alone or in combination with a pigmented and/or metallized layer within the polymeric film, when the polymer layer is substantially transparent or substantially transparent.

Those of ordinary skill in the art are readily familiar with materials and methodology for formation of pigmented layers and metallized layers. Any suitable such material and methodology may be utilized in those embodiments of the present invention where the polymeric film is pigmented and/or metallized. While more than one pigmented and/or metallized layer can be used in polymeric films of the invention, the following description is made with reference to one such layer for simplicity only. Recognize that, if multiple pigmented and/or metallized layers are used, each pigmented and/or metallized layer can be the same or different.

When present, the metallized layer comprises any suitable material and provides desired aesthetics when the polymeric film is adhered to a surface. The metallized layer can be a continuous or discontinuous layer. Note that the metallized layer may consist essentially of graphics, patterns, and the like, which results in the layer being a discontinuous layer and/or a non-planar layer.

In one embodiment, a metallization layer is formed by chemical or physical vapor deposition of a thin layer of aluminum or a desired metal or alloy thereof. The metallized layer comprises any suitable thickness. In an exemplary embodiment, the metallized layer has a maximum thickness of about 1,000 Angstroms, preferably less than about 500 Angstroms. In a further embodiment, the metallized layer has a minimum thickness of at least about 70 Angstroms.

When present, the pigmented layer comprises any suitable material and provides desired aesthetics when the polymeric film is adhered to a surface. The pigmented layer can be a continuous or discontinuous layer. Note that the pigmented layer may consist essentially of graphics, patterns, and the like, which results in the layer being a discontinuous layer and/or a non-planar layer.

The pigmented layer generally comprises at least one material imparting desired color to the polymeric film or portion thereof. In one embodiment, the pigmented layer comprises dye. In another embodiment, the pigmented layer comprises ink. Any suitable commercially available ink can be used. Non-limiting examples of suitable inks include pigmented acrylic ink (including pigmented, fast-dry, acrylic ink), pigmented urethane ink, epoxy ink, and a urethane enamel coating such as that sold by PRC-Desoto International, Inc. (a division of PPG Aerospace) of Glendale, Calif. under the trade designation, DESOTHANE HS.

Any suitable additives can optionally be used in the pigmented layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the pigmented layer. If desired, an adhesion promoter may be included in the pigmented layer. However, in preferred embodiments, the material comprising the pigmented layer is selected to be chemically compatible with adjacent layers of the polymeric film. Thus, an adhesion promoter is not required according to preferred embodiments of the invention.

Preferably, the pigmented layer is essentially free of components that may tend to migrate to the outer surface of the polymeric film or to an interface therein, where such components may promote interlayer delamination or otherwise detrimentally affect the adherence of the polymeric film to adjacent surfaces or layers. The pigmented layer is also preferably resistant to chemicals to which it may be exposed during use of the polymeric film.

The pigmented layer comprises any suitable thickness. In an exemplary embodiment, the pigmented layer has a maximum thickness of about 50 microns, more preferably less than about 25 microns, and preferably about 5 microns to about 8 microns.

Preferably, the polymer layer is essentially free of components that may tend to migrate to the outer surface of the polymeric film or to an interface therein, where such components may promote interlayer delamination or otherwise detrimentally affect adherence of the polymeric film to adjacent surfaces or layers. The polymer layer is also preferably resistant to chemicals to which it may be exposed during use of the polymeric film. For example, it is preferred that the polymer layer is resistant to degradation by water and hydraulic fluids. It is also preferred that the polymer layer is thermally resistant to temperatures to which it may be exposed during use of the polymeric film.

The polymer layer comprises any suitable thickness. In one embodiment, the polymer layer has a thickness of about 10 microns to about 400 microns. In another embodiment, the polymer layer has a thickness of about 10 microns to about 200 microns. In yet another embodiment, the polymer layer has a thickness of about 10 microns to about 50 microns. In an exemplary embodiment, the polymer layer is about 25 microns thick or less. It has been found that use of a relatively thin polymer layer contributes to superior stretchability of the polymeric film. Such stretchability allows polymeric films of the invention to be effectively used in covering articles having curved or other non-planar surfaces.

When present, the adhesive layer comprises any suitable material. According to one embodiment, the adhesive layer generally comprises a base polymer with one or more additives. While any suitable chemistry can be used for the base polymer in the adhesive layer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene and copolymers thereof, and silicones (e.g., polydimethylsiloxane and polymethylphenylsiloxane). In a preferred embodiment, the adhesive layer comprises a pressure-sensitive adhesive (PSA).

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, fillers, and other conventional adhesive additives as known to those of ordinary skill in the art can be incorporated into the adhesive layer. If desired, an adhesion promoter may be included in the adhesive layer. However, in preferred embodiments, the material comprising the adhesive layer is selected to be chemically compatible with the polymer layer of the polymeric film. Thus, an adhesion promoter is not required according to preferred embodiments of the invention.

Similar to the polymer layer, the adhesive layer may be pigmented and/or metallized and substantially transparent, substantially translucent, or substantially opaque, depending on the application and depending on such properties of the polymer layer and any pigmented and/or metallized layer within the polymeric film. In one embodiment, when the polymer layer is substantially transparent or substantially translucent, pigment and/or metallization is provided on the adhesive layer at its interface with the polymer layer. In this embodiment, the adhesive layer can be impregnated with a material (e.g., titanium dioxide) that causes the adhesive layer to function as a reflective background, bringing out the color of the overlying pigment.

Preferably, the adhesive layer is essentially free of components that may tend to migrate to the outer surface of the polymeric film or to an interface therein, where such components may promote interlayer delamination or otherwise detrimentally affect the adherence of the polymeric film to adjacent surfaces or layers. The adhesive layer is also preferably resistant to chemicals to which it may be exposed during use of the polymeric film. For example, it is preferred that the adhesive layer is resistant to degradation by water and hydraulic fluids.

The adhesive layer comprises any suitable thickness. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness of the adhesive layer can vary substantially without departing from the spirit and scope of the invention.

In an exemplary embodiment, the polymeric film is an extensible protective sheet as described in U.S. Patent Publication No. US-2008-0286576-A1, entitled "Protective Sheets, Articles, and Methods," incorporated herein by reference in its entirety. An exemplary polymeric film is also described in U.S. Patent Publication No. US-2010-0059167-A1, entitled "Paint Replacement Films, Composites Therefrom, and Related Methods," incorporated herein by reference in its entirety.

Until the polymeric film is adhered to a surface, it can be stored with an optional release liner adjacent the adhesive layer, when present. The selection and use of such liners is within the knowledge of one of ordinary skill in the art. Advantageously, when employing improved application methods according to the invention, the release liner to which the adhesive layer is adhered need not be textured to impart air egress channels in the adhesive layer. In a preferred embodiment, while some randomly oriented texture may be present on the surface of the adhesive layer to be applied to an article, the adhesive layer is essentially free of ordered texture—e.g. air egress channels (such as those present in structured release liners marketed by Loparex LLC of Cary, N.C., under the trade designation, POLY SLIK air release liners)—when the polymeric film is adhered to a surface. As such, any release liner adhered to the adhesive layer prior to its application is essentially smooth according to such preferred embodiments.

Preferably, essentially smooth release liners have a profile roughness parameter ($R_a$) value of less than about 50 nanometers as measured according to, for example, DIN 4768. More preferably, essentially smooth release liners have a profile roughness parameter ($R_a$) value of less than about 30 nanometers as measured according to, for example, DIN 4768. Even more preferably, essentially smooth release liners have a profile roughness parameter ($R_a$) value of less than about 10 nanometers as measured according to, for example, DIN 4768.

Those of ordinary skill in the art are readily familiar with the wide variety of suitable smooth release liners, many of which are readily marketed as "optically clear" release liners. Exemplary release liners that are essentially smooth include those marketed by the NORTON films group of Saint-Gobain Performance Plastics Corp. (Aurora, Ohio) under the trade designations, OPTILINER and SUPRA-LINER.

Polymeric films can be applied to a variety of articles to form assemblies according to methodology of the present invention. When applied to an article, the polymeric film and at least one exterior surface of the article are contacted to form an assembly.

According to the invention, at least one gaseous agent is provided to at least one surface of the polymeric film and/or at least one exterior surface of the article to be contacted when forming the assembly. As used herein, "gaseous agent" refers to an agent in its gas vapor phase as opposed to its solid or liquid phase. That is, gaseous agents of the invention are substances present in their gas phase at a temperature lower than that of the vapor-liquid thermodynamic critical point for the substance, where the substance could otherwise also exist in the liquid or solid state. While micro-atomized water, such as that used in misting systems for cooling and/or hydrating environments, could be provided instead of or in addition to gaseous agents according to the invention, it is preferred that no substance is conveyed to a surface in its liquid phase to form a coating on at least one surface of the polymeric film and/or at least one exterior surface of the article to be contacted when forming the assembly. According to preferred methods of the invention, a substance is conveyed to the surface in its gas vapor phase, enabling a desired coating of the applied gaseous agent to be formed. Advantageously, such methods facilitate relatively rapid adhesion properties and efficiency when forming the assembly.

Before contacting the polymeric film and the at least one exterior surface of the article, however, the release liner, if present, is removed from the adhesive layer, if also present, of the polymeric film. Thereafter, the polymeric film is firmly adhered to the article of the assembly using any suitable forming technique and associated forming equipment.

One of ordinary skill in the art is readily familiar with forming techniques and associated forming equipment. In an exemplary embodiment, methods of the invention employ vacuum forming techniques using vacuum forming equipment and methodology as known to those of ordinary skill in the art. Depending on topography of the article to which the polymeric film is adhered, however, vacuum forming may be unnecessary. Those articles having relatively simple topography, for example, are typically capable of having a polymeric film effectively applied thereto according to the invention using general forming equipment. A wide variety of general forming equipment and vacuum forming equipment is commercially available from suppliers, such as Bel-O-Vac Industries (Banning, Calif.).

Polymeric films may be applied to any suitable article (e.g., a motorized transportation vehicle, such as an aircraft or automobile) according to methods of the invention. Numerous possibilities exist for the nature of the article, but further description follows in relation to an exemplary embodiment wherein the article comprises a helmet. Once applied, polymeric films can cover substantially all of or select portions of at least one exterior surface of an article. In one embodiment, after application of a polymeric film thereto, the resulting article comprises at least one surface having on at least a portion thereof a polymeric film.

FIG. 1 is a perspective view of a step of providing a polymeric film 100 sized to cover at least a portion of at least one exterior surface 102 of a helmet 104. During an exemplary forming process, such as that method illustrated in FIGS. 1, 2A-2C, 3, 4A-4B, 5, and 6, a gaseous agent is provided to at least one surface of the polymeric film and/or at least one exterior surface of the article to be contacted when forming an assembly. In general, the gaseous agent is provided to a surface that is maintained at a temperature that is below the dew point of the gaseous agent. According to one aspect of the invention, the surface is maintained at about room temperature—i.e., about 22° C. to about 25° C.—so as to promote formation thereon of a coating from the gaseous agent.

Figure 2A:
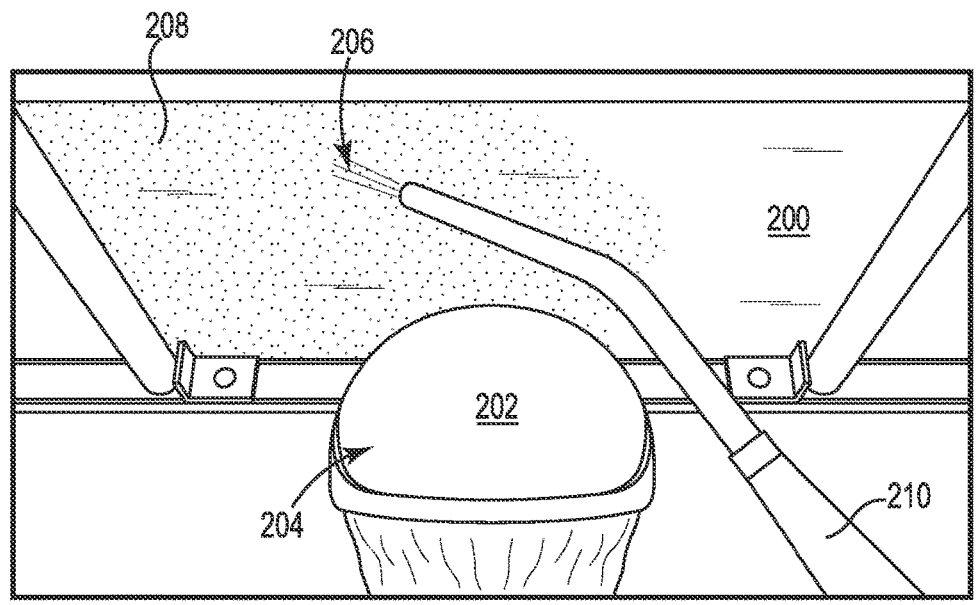
FIG. 2A is a perspective view of a step of providing a gaseous agent on a polymeric film that is to be applied to a helmet according to an exemplary embodiment of the invention.
Figure 2B:
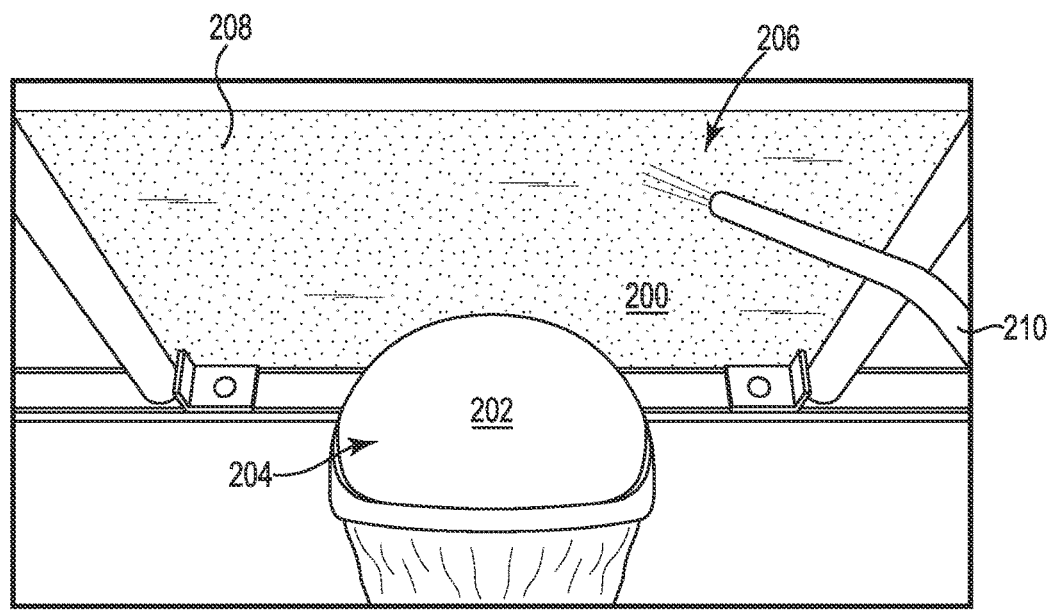
FIG. 2B is a further perspective view of a step of providing a gaseous agent on a polymeric film that is to be applied to a helmet according to an exemplary embodiment of the invention.
Figure 2C:
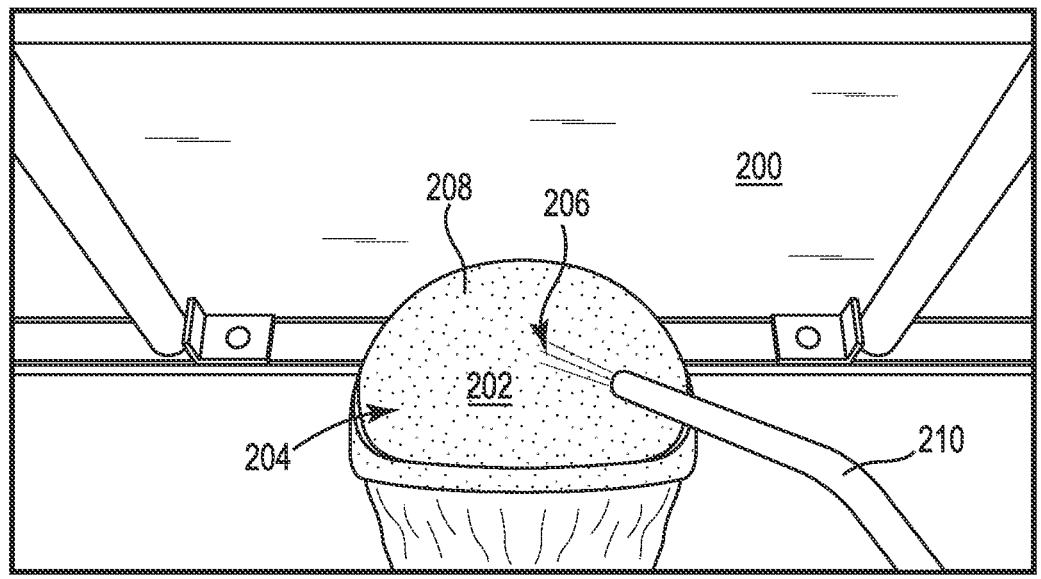
FIG. 2C is a perspective view of a step of providing a gaseous agent on at least one exterior surface of a helmet to be contacted with a polymeric film according to an exemplary embodiment of the invention.
Figure 3:
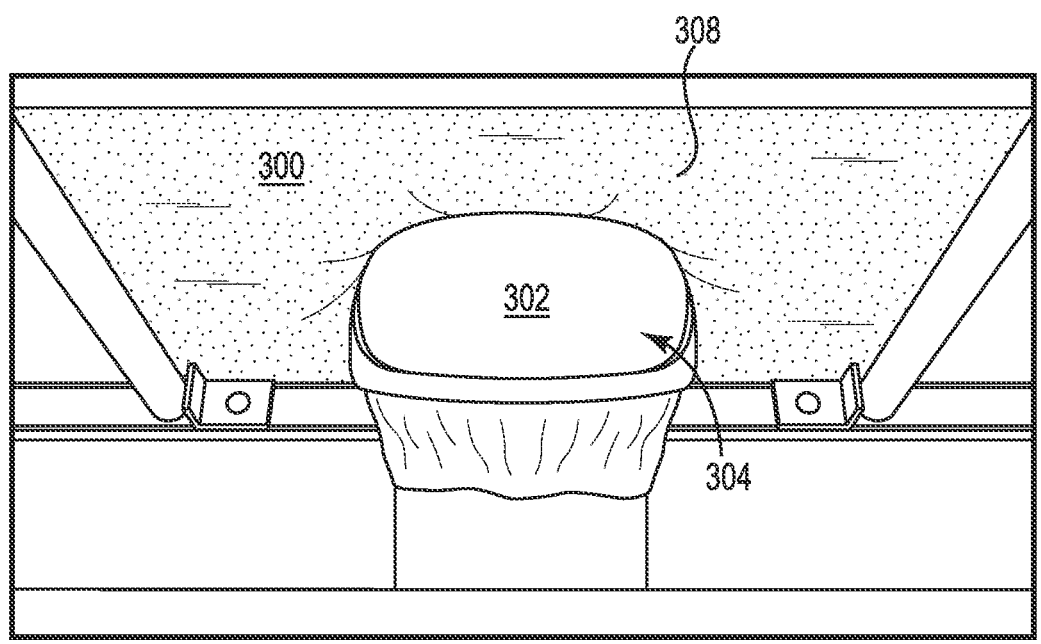
FIG. 3 is a perspective view of a step of contacting at least a portion of a polymeric film and at least a portion of at least one exterior surface of a helmet according to an exemplary embodiment of the invention.
Figure 4A:
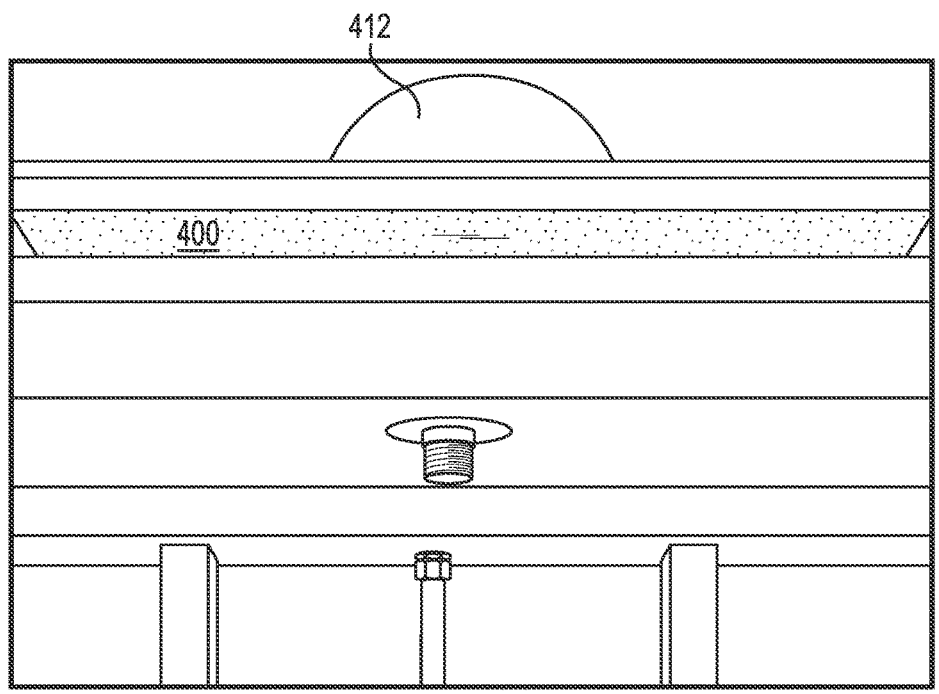
FIG. 4A is a perspective view of a step of initiating form-fitting of a polymeric film with a portion of at least one exterior surface of a helmet according to an exemplary embodiment of the invention.
Figure 4B:
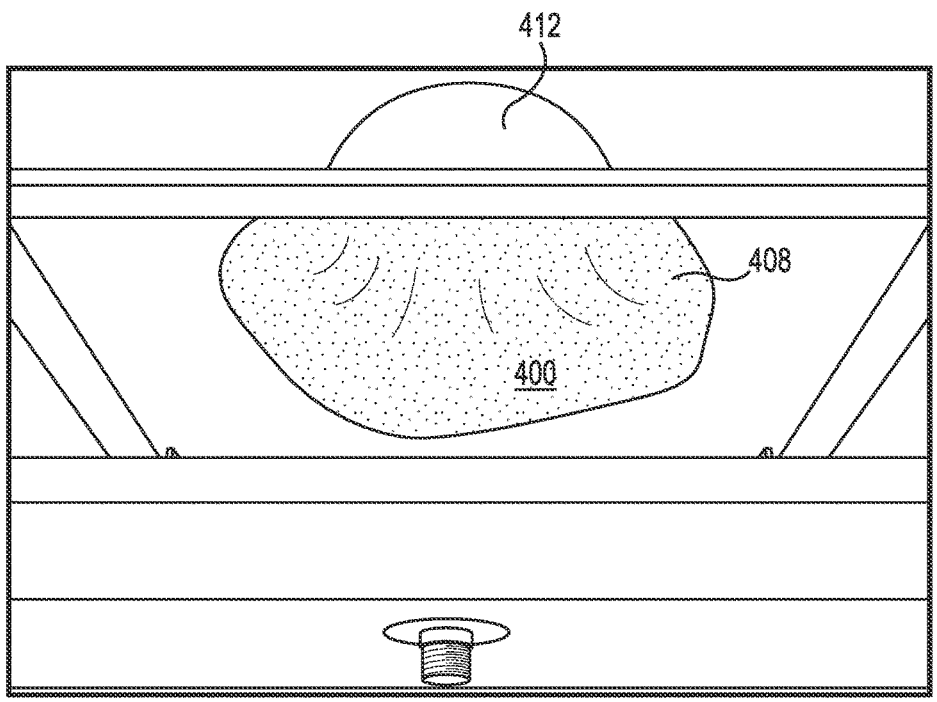
FIG. 4B is perspective view of a step of form-fitting a polymeric film with a portion of at least one exterior surface of a helmet according to an exemplary embodiment of the invention.
Figure 5:
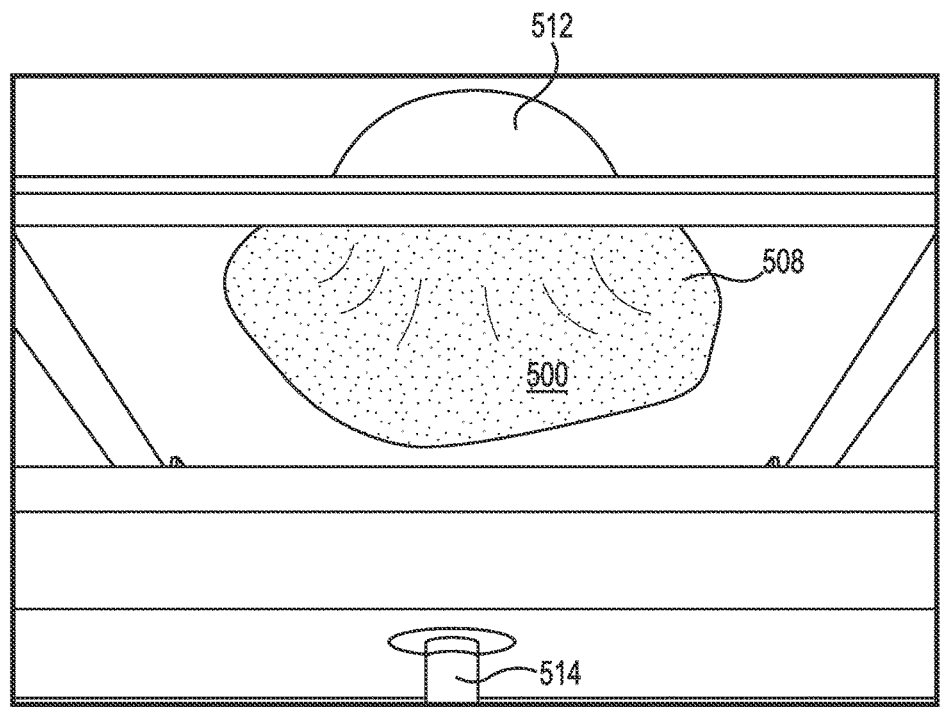
FIG. 5 is perspective view of a step of removing substantially all applied gaseous agent at an interface between a polymeric film and a helmet according to an exemplary embodiment of the invention.
Figure 6:
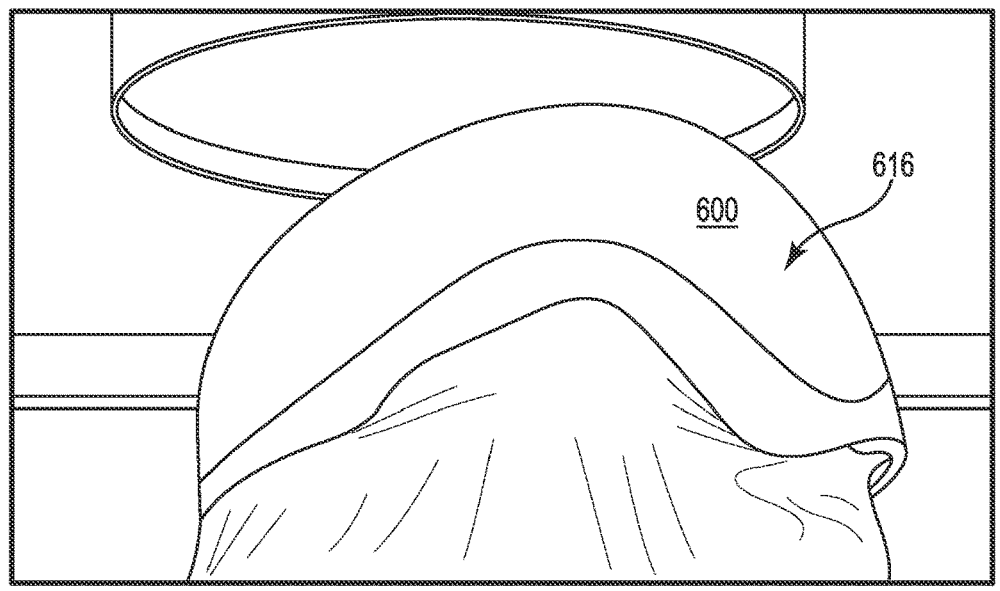
FIG. 6 is a perspective view of a polymeric film-covered helmet prepared according to an exemplary embodiment of the invention.

The gaseous agent is provided before, or while, the surfaces are being contacted. FIG. 2A is a perspective view of a step of providing a gaseous agent 206 on a polymeric film 200 that is to be applied to a helmet 204 according to an exemplary embodiment of the invention. FIG. 2B is a further perspective view of a step of providing a gaseous agent 206 on a polymeric film 200 that is to be applied to a helmet 204 according to an exemplary embodiment of the invention. FIG. 2C is a perspective view of a step of providing a gaseous agent 206 to at least one exterior surface 202 of a helmet 204 to be contacted with a polymeric film 200 according to an exemplary embodiment of the invention.

Timing for providing the gaseous agent 206 is not critical as long as a desired coating 208 of the applied gaseous agent 206 exists on the polymeric film 200 and/or exterior surface 202 of the article 204 when the two components 200, 204 are contacted together to form the assembly. When vacuum forming techniques are used, the gaseous agent 206 is preferably provided before application of a vacuum to the assembly or components 200, 204 thereof.

The gaseous agent 206 is applied to at least one of the surface of the polymeric film 200 and the exterior surface 202 of the article 204 to be contacted when forming the assembly. While its thickness and/or continuity may vary across a surface and/or depending on the application, a desired coating 208 resulting from application of the gaseous agent 206 is, thus, formed on the surface 200, 202 or surfaces on which the gaseous agent 206 is applied. Preferably, due to the nature in which it is formed—i.e., by conveyance of an agent 206 to the surface 200, 202 in the gas phase, the coating 208 is differentiated from coatings of the agent otherwise formed by conveyance of the agent to a surface in its liquid phase.

Unlike coatings conveyed to a surface in the liquid phase, coatings 208 formed according to methods of the present invention generally have a relatively high concentration of droplets—i.e., the coating 208 has a drop density of at least about $10^4$ droplets per square centimeter, at least about $10^5$ droplets per square centimeter, and even at least about $10^6$ droplets per square centimeter in certain embodiments.

Preferably, the coating 208 comprises an essentially uniformly dispersed array of droplets of approximately the same size across the surface. In a preferred embodiment, similar dimensions of droplets within a coating 208 are within an order of magnitude of each other. For example, diameters of individual droplets within the coating 208 do not vary by more than an order of magnitude according to this preferred embodiment. As another example, heights of individual droplets within the coating 208 do not vary by more than an order of magnitude according to this preferred embodiment.

In one embodiment, the droplets have an average diameter (as measured in the plane of the surface on which it is formed) of less than approximately 500 microns. In a further embodiment, the droplets have an average diameter of less than approximately 200 microns. In still a further embodiment, the droplets have an average diameter of less than approximately 50 microns. In yet a further embodiment, the droplets have an average diameter of less than approximately 20 microns. In a further embodiment still, the droplets have an average diameter of less than approximately 10 microns. In an exemplary embodiment, the droplets having an average diameter of less than approximately 5 microns.

In one embodiment, no measurable dimension of essentially each droplet in the coating 208 is greater than about 500 microns, more preferably no measurable dimension is greater than about 200 microns. Preferably, essentially each droplet in the coating 208 has a height that is less than thickness of the polymeric film 200 or, when present, the adhesive layer of the polymeric film 200. In a preferred embodiment, thickness of the coating 208 (i.e., maximum height of droplets therein) is equivalent to thickness of about one monolayer of the agent 206.

In one embodiment, essentially each droplet in the coating 208 has a height of less than approximately 200 microns. In a further embodiment, essentially each droplet in the coating 208 has a height of less than approximately 50 microns. In yet a further embodiment, essentially each droplet in the coating 208 has a height of less than approximately 20 microns. In still a further embodiment, essentially each droplet in the coating 208 has a height of less than approximately 10 microns. Further still, in one embodiment, essentially each droplet in the coating 208 has a height of less than approximately 5 microns.

According to one aspect of the invention, the coating 208 is substantially discontinuous across the surface. Discontinuity is introduced as the coating 208 is created as droplets form on the surface via nucleation and growth from the gas vapor phase to create an array of droplets that is, preferably, essentially a single layer of droplets. Surprisingly, although not a monolithic film, the array of droplets (i.e., the coating 208) is uniformly distributed across the entire surface. According to methods of the invention, the coating 208 extends across essentially the entire surface with a consistent, yet decreased, volume of liquid, as compared to a coating conveyed to a surface in the liquid phase. While conveying an agent to the surface via a liquid phase (e.g., by spraying a liquid) can provide a continuous stream of droplets, once those droplets impinge upon the surface at a given velocity, often at the same location as other droplets, the droplets typically coalescence to form a monolithic film. While such coalescence may be desirable for certain applications, it prevents formation of a coating 208 that is an array of droplets, as achievable according to methods of the invention. As discussed throughout, the array of droplets in preferred coatings formed according to methods of the invention advantageously promotes more rapid and effective adhesion of the polymeric film 200 than that that would be provided by a monolithic film of the same agent having a thickness approximating average height of the droplets.

In one embodiment, volume of liquid in a coating 208 of the invention is less than approximately 90% of volume of an equivalent liquid in a monolithic film extending across the same surface area and having a thickness approximating average height of the droplets in the coating 208. That is, volume of liquid in the coating 208 is less than approximately 90% of volume of an equivalent liquid in a monolithic film extending across an identical surface area and having a thickness approximating thickness of the coating 208. In a further embodiment, volume of liquid in a coating 208 of the invention is less than approximately 80% of volume of an equivalent liquid in a monolithic film extending across the same surface area and having a thickness approximating average height of the droplets in the coating 208. In yet a further embodiment, volume of liquid in a coating 208 of the invention is less than approximately 70% of volume of an equivalent liquid in a monolithic film extending across the same surface area and having a thickness approximating average height of the droplets in the coating 208. In a further embodiment still, volume of liquid in a coating 208 of the invention is less than approximately 60% of volume of an equivalent liquid in a monolithic film extending across the same surface area and having a thickness approximating average height of the droplets in the coating 208. In still a further embodiment, volume of liquid in a coating 208 of the invention is less than approximately 55% of volume of an equivalent liquid in a monolithic film extending across the same surface area and having a thickness approximating average height of the droplets in the coating 208 (i.e., thickness of the coating 208).

Volume of liquid in a coating 208 of the invention decreases as spacing between droplets increases. In one embodiment, although extending across essentially an entire surface, droplets forming a coating 208 of the invention cover less than about 80% of that surface area. In a further embodiment, droplets forming a coating 208 of the invention cover less than about 70% of that surface area. In yet a further embodiment, droplets forming a coating 208 of the invention cover less than about 60% of that surface area. According one aspect of the invention, the coating 208 preferably has a coating weight of less than about 100 grams per square meter (gsm), more preferably a coating weight of less than about 50 gsm, more preferably a coating weight of less than about 20 gsm, and even more preferably a coating weight of less than about 10 gsm. Those of ordinary skill in the art readily understand that coating weight will vary, however, depending upon the nature of the agent forming the coating.

Unlike films applied to surfaces using conventional wet-apply techniques, which films are often repositionable due at least in part to presence of a continuous and substantial liquid film on the surface, polymeric films applied to a surface of an article according to methods of the invention cannot generally be lifted from and re-applied to the surface without significantly altering the polymeric film and/or surface.

Figure 7:
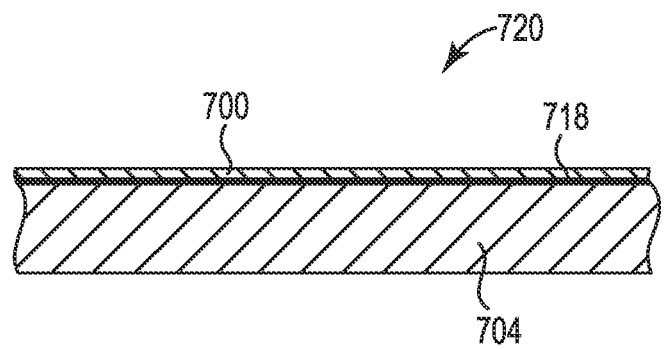
FIG. 7 is a cross-sectional representation of one embodiment of a polymeric film-covered helmet prepared according to an exemplary embodiment of the invention.
Figure 8:
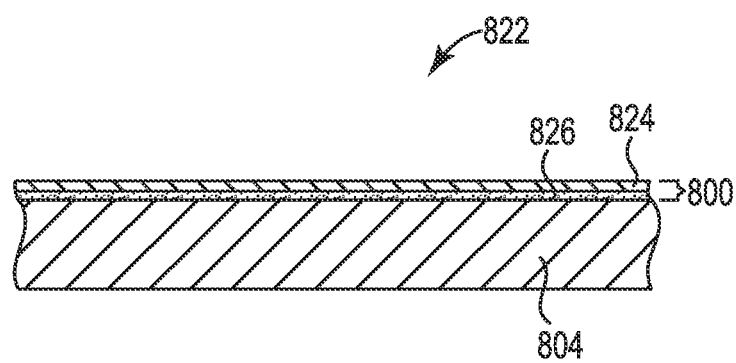
FIG. 8 is a cross-sectional representation of another embodiment of a polymeric film-covered helmet prepared according to an exemplary embodiment of the invention.

Rapid adhesion of polymeric films 200 to a surface according to methods of the invention is promoted by properties of the coating 208 formed from the applied gaseous agent 206. Again, unlike coatings conveyed to a surface in the liquid phase, coatings formed according to methods of the present invention are capable of being less substantial. Minimizing the amount of undesired liquid needing to be removed from between the polymeric film and surface on which it is applied facilitates automation of the polymeric film application process and increases its efficiency. Minimizing the amount of undesired liquid enables the film to adhere more quickly and not require rework. Still further, minimizing the amount of undesired liquid also decreases the need for application of heat or an extended period of time for effective removal of the undesired liquid. Further, due to the relatively insubstantial coating formed according to methodology of the invention, a squeegee is not required for removal of larger quantities of undesired liquid at the interface of films applied to a surface using conventional wet-apply techniques. Not only does the necessity for using a squeegee decrease efficiency of the application process, it is also increasingly troublesome as the topography of underlying surfaces increases in complexity and can even detrimentally mar or tear the film, especially as thickness of the film decreases.

The rate and duration for providing the gaseous agent 206 are adjusted according to knowledge of those of ordinary skill in the art to obtain a desired coating 208 of the agent on the surface 200, 202 or surfaces on which the gaseous agent 206 is provided. In one embodiment, the flow rate is continuous. In another embodiment, the flow rate is discontinuous (e.g., pulsed).

Any suitable material may be used for the gaseous agent 206. In one embodiment, the agent substantially remains in the form of a coating or layer (e.g., a tie layer) within an article comprising a polymeric film 200 applied thereto according to methods of the invention. In another embodiment, the gaseous agent 206 comprises a solvent bonding agent (e.g., that used in solvent welding). According to another embodiment, the agent dissipates after application to a surface and does not generally remain within an article comprising a polymeric film 200 applied thereto according to methods of the invention.

In one embodiment, the gaseous agent 206 is water-based. While non-aqueous components may be present in such a gaseous water-based agent, water is the major component thereof. An exemplary gaseous water-based agent is steam. In an alternative embodiment, the gaseous agent is alcohol-based. Exemplary alcohol-based agents include methanol, propanol (e.g., isopropyl alcohol), and mixtures thereof, with alcohol being the major component thereof.

Any suitable equipment is used for providing the gaseous agent 206. For example, a hand-held nozzle 210 can effectively pump steam to at least one surface that will form the interface between the polymeric film 200 and the article 204. Similarly, any suitable equipment (not shown) is used to create the gaseous agent 206 as known to those of ordinary skill in the art. Advantageously, energy requirements for these aspects of methods of the invention are relatively insignificant as compared to those utilizing thermal bonding or other elevated temperature processing equipment. Thus, the carbon footprint is minimized when utilizing methods of the present invention as compared to many conventional methodologies. Exemplary equipment for creation of steam includes commercially available steam cleaners, such as those Industrial Steam Cleaners having a working pressure of 0-150 psi (SI Units) sold by Acklands-Grainger, Inc. (Richmond Hill, Ontario, Canada). Although generally at a higher temperature when formed, the gaseous agent preferably contacts the surface 200, 202 or surfaces on which the gaseous agent 206 is provided at or slightly above room temperature—i.e., about 22° C. to about 25° C. Equipment and methodology (e.g., distance between the hand-held nozzle 210 and the polymeric film 200 and/or article 204) is adjusted accordingly.

FIG. 3 is a perspective view of a step of contacting at least a portion of a polymeric film 300 having a coating 308 from the applied gaseous agent thereon and at least a portion of at least one exterior surface 302 of a helmet 304 according to an exemplary embodiment of the invention. FIG. 4A is a perspective view of a step of initiating form-fitting of a polymeric film 400 with a portion of at least one exterior surface of a helmet in a form-fitting chamber 412 according to an exemplary embodiment of the invention. FIG. 4B is perspective view of a further step of form-fitting a polymeric film 400 with a portion of at least one exterior surface of a helmet in a form-fitting chamber 412 according to an exemplary embodiment of the invention. FIG. 5 is perspective view of a step of removing substantially all applied agent at an interface between a polymeric film 500 and a helmet using a vacuum (provided by mechanism 514, only partially shown in FIG. 5) according to an exemplary embodiment of the invention. Those of ordinary skill in the art are readily familiar with form-fitting equipment and methodology. As such, further details are not provided herein.

FIG. 6 is a perspective view of a polymeric film-covered helmet 616 prepared according to an exemplary embodiment of the invention. FIG. 7 is a cross-sectional representation of one embodiment of an assembly 720 prepared according to an exemplary embodiment of the invention. In the embodiment illustrated in FIG. 7, the agent remains in the form of a coating or layer 718 within an assembly 720 comprising a polymeric film 700 applied to an article 704 according to methods of the invention. FIG. 8 is a cross-sectional representation of one embodiment of another assembly 822 prepared according to an exemplary embodiment of the invention. In the embodiment illustrated in FIG. 8, the agent is not shown, as it dissipative in nature. The polymeric film 800 used in the assembly 822 comprises a polymer layer 824 and adhesive layer 826, each of which is individually shown in FIG. 8. As in other embodiments, the polymeric film 800 is applied to an article 804 according to methods of the invention.

When a coating formed from the gaseous agent is intended to be dissipative in nature, some residual agent (i.e., coating) may remain immediately after the step of form-fitting the polymeric film. In a preferred embodiment, however, essentially no residual agent remains immediately after the step of form-fitting the polymeric film. According to a further aspect of the invention, the adhesive layer is permeable to the coating formed from the gaseous agent to assist in removal of the coating during the step of form-fitting the polymeric film. Therefore, any residual coating remaining immediately after the step of form-fitting the polymeric film will typically dissipate within a relatively short period of time.

Advantageously, when using methodology of the present invention for application of polymeric film to at least one exterior surface of an article in preferred embodiments, essentially no visible (i.e., visible to the unaided human eye) air pockets/bubbles are present between the polymeric film and the article. Further, when using methodology according to preferred embodiments of the present invention, essentially no visible markings imparted by structure of the adhesive layer (e.g., structure associated with air egress channels according to conventional methodology) are present between the polymeric film and the article. This advantageous feature is most evident when the polymeric film is a relatively thin, optically clear film.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited or separately in time. Those of ordinary skill in the art will recognize variations in performing the steps from the order in which they are recited.

The invention claimed is:

1. A method of applying a polymeric film to an article when forming an assembly, the method comprising:
providing the polymeric film, wherein the polymeric film is sized to cover at least a portion of at least one exterior surface of the article;
providing at least one water-based or alcohol-based gaseous agent to form a coating from the same on at least one surface of the polymeric film and/or at least the portion of the at least one exterior surface of the article to be contacted when forming the assembly;
while the coating exists, contacting at least a portion of the polymeric film and at least the portion of the at least one exterior surface of the article;
form-fitting the polymeric film with at least the portion of the at least one exterior surface of the article; and
removing substantially all of the coating at an interface between the polymeric film and the article.

2. The method of claim 1, wherein the at least one gaseous agent is water-based.
3. The method of claim 1, wherein the at least one gaseous agent is alcohol-based.
4. The method of claim 1, wherein the at least one gaseous agent is dissipative.
5. The method of claim 1, wherein the step of form-fitting the polymeric film comprises form-fitting the polymeric film using vacuum forming techniques.
6. The method of claim 1, wherein the polymeric film is stretchable.
7. The method of claim 1, wherein the polymeric film is extensible.
8. The method of claim 1, wherein the polymeric film comprises an at least partially pigmented polymeric film.
9. The method of claim 1, wherein the polymeric film comprises an at least partially metallized polymeric film.
10. The method of claim 1, wherein the polymeric film comprises an adhesive layer.
11. The method of claim 10, wherein the adhesive layer of the polymeric film is adhered to an essentially smooth release liner prior to forming the assembly and further comprising the step of removing the essentially smooth release liner from the adhesive layer prior to forming the assembly.
12. The method of claim 1, wherein the polymeric film has an overall thickness of less than about 400 microns.
13. The method of claim 1, wherein the polymeric film has an overall thickness of less than about 50 microns.
14. The method of claim 1, wherein the at least one gaseous agent is steam.
15. The method of claim 1, wherein the coating comprises an array of droplets having an average diameter of less than about 200 microns.
16. The method of claim 1, wherein the coating comprises an array of droplets, each droplet having a height of less than about 200 microns.
17. The method of claim 1, wherein volume of liquid in the coating is less than approximately 90% of volume of the liquid that would exist in a monolithic film extending across an identical surface area and having a thickness approximating thickness of the coating.
18. The method of claim 1, wherein the coating has a coating weight of less than about 100 grams per square meter.
19. The method of claim 1, wherein the coating has a coating weight of less than about 50 grams per square meter.
20. The method of claim 1, wherein the coating has a coating weight of less than about 10 grams per square meter.
21. A method of applying a polymeric film to an article when forming an assembly, the method comprising:
providing the polymeric film, wherein the polymeric film is sized to cover at least a portion of at least one exterior surface of the article;
providing at least one water-based or alcohol-based gaseous agent to form a coating from the same on at least one surface of the polymeric film and/or at least the portion of the at least one exterior surface of the article to be contacted when forming the assembly;
while the coating exists, contacting at least a portion of the polymeric film and at least the portion of the at least one exterior surface of the article; and
form-fitting the polymeric film with at least the portion of the at least one exterior surface of the article,
wherein the article comprises at least a portion of a helmet.
22. The method of claim 1, wherein the article comprises at least a portion of a motorized vehicle.

23. The method of claim 1, wherein the article comprises at least a portion of an aircraft.

24. The method of claim 1, wherein the article comprises at least a portion of an automobile.

25. The method of claim 1, wherein essentially no visible air pockets/bubbles and markings are present between the polymeric film and the article.

26. A method of applying a polymeric film to an article when forming an assembly, the method comprising:
- providing the polymeric film, wherein the polymeric film is sized to cover at least a portion of at least one exterior surface of the article;
- providing at least one water-based or alcohol-based gaseous agent to form a coating from the same on at least one surface of the polymeric film and/or at least the portion of the at least one exterior surface of the article to be contacted when forming the assembly;
- while the coating exists, contacting at least a portion of the polymeric film and at least the portion of the at least one exterior surface of the article; and
- form-fitting the polymeric film with at least the portion of the at least one exterior surface of the article, wherein no substance is conveyed in its liquid phase to the portion of the at least one exterior surface of the article to be contacted when forming the assembly.

27. A method of applying a polymeric film to an article when forming an assembly, the method comprising:
- providing the polymeric film, wherein the polymeric film is sized to cover at least a portion of at least one exterior surface of the article;
- providing at least one water-based or alcohol-based gaseous agent to form a coating from the same on at least one surface of the polymeric film and/or at least the portion of the at least one exterior surface of the article to be contacted when forming the assembly;
- while the coating exists, contacting at least a portion of the polymeric film and at least the portion of the at least one exterior surface of the article; and
- form-fitting the polymeric film with at least the portion of the at least one exterior surface of the article, wherein the portion of the at least one exterior surface of the article to be contacted when forming the assembly is maintained at about room temperature so as to promote formation thereon of the coating from the gaseous agent.

\* \* \* \* \*